United States Patent
Lalwaney et al.

(10) Patent No.: US 6,289,377 B1
(45) Date of Patent: Sep. 11, 2001

(54) DYNAMIC NETWORK CONFIGURATION OF A ONE-WAY ADAPTER USING A PROXY AGENT THAT COMMUNICATES WITH A RESOURCE SERVER THROUGH A CONFIGURED RETURN PATH ADAPTER

(75) Inventors: Poornima Lalwaney, San Diego; Jonathan A. Fellows, Del Mar, both of CA (US)

(73) Assignee: General Instrument Corporation, Horsham, PA (US)

(*) Notice: Subject to any disclaimer, the term of this patent is extended or adjusted under 35 U.S.C. 154(b) by 0 days.

(21) Appl. No.: 09/179,696

(22) Filed: Oct. 27, 1998

Related U.S. Application Data (60) Provisional application No. 60/065,055, filed on Nov. 10, 1997.

(51) Int. Cl.[7] .................................................. G06F 13/00
(52) U.S. Cl. .................................... 709/222; 709/245
(58) Field of Search .................................. 709/203, 222, 709/245

(56) References Cited

U.S. PATENT DOCUMENTS

| | | | |
|---|---|---|---|
| 5,347,304 | 9/1994 | Moura et al. | 725/131 |
| 5,666,487 | 9/1997 | Goodman et al. | 709/246 |
| 5,862,220 * | 1/1999 | Perlman | 380/21 |
| 5,978,381 * | 11/1999 | Perlman et al. | 370/432 |

* cited by examiner

*Primary Examiner*—Kenneth R. Coulter
(74) *Attorney, Agent, or Firm*—Barry R. Lipsitz; Douglas M. McAllister (57) ABSTRACT

A one-way adapter such as a cable modem is initialized to allow a personal computer to receive data from a computer network such as the Internet via a broadcast channel, while transmitting data upstream to the computer network via a telephone line. First, a two-way adapter such as a phone modem is initialized by establishing a telephone link with a terminal server of an Internet Service Provider telephone network. The terminal server obtains an IP address from a phone network address server, and assigns the IP address to the phone modem stack. Next, the cable modem stack sends out a request for session initialization to a cable modem driver. The request is processed by a packet processing relay agent (PPRA), and the IP address of the phone modem is inserted into the packet. The IP packet destination address is set to that of a cable network address server. A cable network address server receives the packet via an upstream telephone line and responds with IP address and configuration information for the relay agent address. The phone modem receives the response and passes it to the cable modem stack via the PPRA. The cable modem is thus initialized with IP address and configuration information and is ready to receive Internet data via a one-way RF channel.

22 Claims, 9 Drawing Sheets

DYNAMIC NETWORK CONFIGURATION OF A ONE-WAY ADAPTER USING A PROXY AGENT THAT COMMUNICATES WITH A RESOURCE SERVER THROUGH A CONFIGURED RETURN PATH ADAPTER

This application claims the benefit of U.S. provisional patent application Ser. No. 60/065,055, filed Nov. 10, 1997.

BACKGROUND OF THE INVENTION

The present invention relates to a method and apparatus for allowing a personal computer to receive data from a computer network such as the Internet via a broadcast channel, e.g., of a cable or satellite television network, while transmitting data upstream to the computer network via a telephone line. In particular, the present invention provides dynamic network configuration of a one-way adapter in a one-way communication system such as a cable television system or the like. A proxy agent is provided for communicating with a resource server of the computer network through a configured return path adapter, thereby providing bi-directional communication between the one-way adapter and the resource server.

The following acronyms are used:

ARP—Address Resolution Protocol;
CPU—Central Processing Unit;
DHCP—Dynamic Host Configuration Protocol;
HTTP—Hyper Text Transport Protocol;
IETF—Internet Engineering Task Force;
IETF—Internet Engineering Task Force;
IGMP—Internet Group Management Protocol;
IP—Internet Protocol;
IPCP—Internet Protocol Configuration Protocol;
ISP—Internet Service Provider;
LAN—Local Area Network;
LMDS—Local Multi-point Distribution System;
MMDS—Multi-channel Multi-point Distribution System;
MSO—Multiple Systems Operator;
PC—Personal Computer;
PPP—Point-to-Point Protocol;
PPRA—Packet Processing Relay Agent;
RF—Radio Frequency;
RFC—Request For Comments;
TCP—Transmission Control Protocol;
UDP—User Datagram Protocol;
UHF—Ultra High Frequency; and
WAN—Wide Area Network.

Existing cable television networks deliver digital television signals to users' homes via coaxial cable, or hybrid fiber and coaxial cable networks. Additionally, satellite distribution networks that transmit programs directly to a user's home have also gained increased popularity. The digital signals transmitted to the user provide high-fidelity video and audio. Other types of data can also be transmitted to the user, such as closed captioning data, stock data, weather reports and the like. This data may be modulated onto an entire television signal channel, or a portion of the television signal channel, such as the vertical blanking interval, and recovered at a decoder in the user's home.

Additionally, some cable networks provide an upstream communication path that allows a user to transmit signals to the headend, for example, to order pay-per-view programming, or to check on an account balance.

Furthermore, computer networks such as the Internet are growing rapidly in popularity, particularly among the general public who use the Internet for entertainment, educational, and informational purposes, and to communicate with other users. A user typically accesses the Internet via a PC and a telephone modem via a conventional duplex telephone line to download graphics, text and even audio and video data from various remote servers. Users may also communicate real-time with one another by transmitting data from a sender's PC to the receiver's PC. Thus, data is transmitted to and from the PC via the two-way telephone modem.

An important difference between telephone and cable or satellite television networks is bandwidth. Because telephone networks were built to carry only voice signals, the bandwidth is very limited, e.g., 3 KHz. In contrast, cable television and satellite networks are designed to deliver full-motion video and, as a result, have a much greater bandwidth, e.g., several hundred MHz or more.

Accordingly, the provision of Internet data services and the like on a cable or satellite network would be highly desirable due to the increased bandwidth available. Such an arrangement would greatly speed the response to the user's PC, while providing additional marketing opportunities for cable and satellite network operators.

However, the provision of an upstream path is not feasible for satellite or terrestrial broadcast networks, including UHF, MMDS and LMDS. Moreover, many cable television networks are not configured for upstream communications, or any such provisioning may be limited and not suitable for handling transmissions from a larger number of users. In particular, network operators may prefer to maintain the available upstream path for significant revenue-enhancing activities such as pay-per-view orders.

Furthermore, since the cable/satellite channel is a broadcast channel, and the telephone line is a point-to-point channel, communication and addressing protocols that are available on a PC do not work seamlessly in the cable/satellite broadcast environment.

Moreover, the communication and addressing protocols of a computer network are generally incompatible with cable and satellite television equipment.

Accordingly, it would be desirable to provide a system that allows a PC to receive data from a computer network such as the Internet via a downstream broadcast channel of a cable, satellite or terrestrial broadcast television network, while transmitting data to the computer network via an upstream telephone line. The system should provide compatibility with the routing/addressing conventions of the protocol stack used by the computer network.

For ease of network operations and management, operators would like the one-way adapters to be configured dynamically with their IP address network configuration information.

The system should provide dynamic network configuration of a one-way adapter, such as a cable or satellite modem, that receives data from a computer network such as the Internet via a downstream broadcast channel of a cable or satellite television network, respectively. Such configuration provides IP addresses and configuration information for the duration of the Internet session. This address can be assigned to other modems when the user is not surfing.

Given that the adapter is one-way receive-only, and that the assignment of network configuration information requires a two-way send and receive communication link, the system should provide a proxy agent that facilitates the dynamic configuration of a one-way adapter and associated network services using a configured return path.

The system should provide compatibility between the one-way adapter and the routing/addressing conventions of the protocol stack used by the computer network.

The present invention provides a system having the above and other advantages.

SUMMARY OF THE INVENTION

The present invention provides dynamic network configuration of a one-way adapter in a one-way communication system such as a cable television system or the like. The invention allows a personal computer, router/bridge or other device to receive data from a computer network such as the Internet via a broadcast channel of a cable, satellite or other terrestrial broadcast television network, while transmitting data upstream to the computer network via a telephone line. The invention thereby allows a user to quickly access and retrieve data from the computer network via a high bandwidth channel.

A proxy agent is provided for communicating with a resource server of the computer network through a configured return path adapter, thereby providing bi-directional communication between the one-way adapter and the resource server.

Dynamic network configuration of an adapter requires bidirectional communication with the resource server through the interface that needs to be configured. The present invention uses a proxy agent that facilitates the dynamic configuration of the one-way adapter and associated network services using the configured return path.

Addresses, such as for a cable modem, are managed using the DHCP. DHCP, as specified in RFC 2131, is one of the commonly used protocols for network adapter configuration. Session initialization messages are UDP broadcasts sent out through the adapter that requires provisioning. Servers on the network listen to these broadcasts and send back the requested information. In a WAN environment, if the server is not on the same network as the client, a machine on the network functions as the DHCP proxy (relay agent) to communicate with the DHCP server. The relay agent receives the broadcasts from the client and sends them as unicast messages to the designated DHCP server(s). The server unicasts the responses to the relay agent, which in turn sends it to the client using the hardware address of the client.

To configure the one-way (receive only) internal cable modem adapter using DHCP, we move the relay agent functionality from the local network to the packet processing agent in the host. The address assigned to the phone modem adapter (the static or dynamic address obtained during phone session initialization using PPP) is used as the relay agent address. The packet processing agent intercepts all packets sent to the cable modem adapter. In addition, it processes all packets sent to and received from the return path adapter. If the packets are identified as DHCP, they are processed by the DHCP relay agent function. Using this scheme, the cable modem addresses can be managed using DHCP.

The above principle of a including a DHCP relay agent function in the packet processing agent may be extended to other dynamic address assignment protocols (e.g., using IPCP or Radius proxy) in the host, multicast address mangement using an "IGMP proxy" function, and network and vendor-specific resource management protocols in systems that use one-way adapters. Systems with one-way adapters include cable modems, wireless modems and satellite modems.

Generally, when a user wants to access (e.g., "surf") the Internet using a PC, a two phase connection process that is controlled by a connection manager application running on the PC occurs. First, a phone modem adapter is initialized, then a cable modem adapter is initialized.

A phone link is established with an ISP terminal server to obtain an IP address and network configuration information that is required for the phone modem adapter's TCP/IP stack. On phone modems, the PPP is used for link establishment, and the IP address and network configuration information is obtained using IPCP, which is a subset of PPP.

Once the PPP link establishment phase is completed, the address and network configuration information is provided by a phone network address management server to the terminal server. The terminal server provides the information to the phone modem stack using IPCP. At this point, the phone modem and the corresponding stack is fully initialized and is capable of two-way communication with the Internet using the IP address obtained by the above PPP process as the source IP address.

The next step in the connection process is the initialization of the cable modem adapter. DHCP is one possible method of dynamically configuring network configuration information. From a network's perspective, the cable modem needs to send out a request for IP address and network configuration parameters. However, since the cable modem adapter is a one-way receive only adapter, the request cannot be sent out over an RF broadcast channel. This is why the PPRA is needed. The cable modem stack sends the request for initialization information to the PPRA via the cable modem driver.

The PPRA handles the request and sends it out of the phone adapter via a telephone line to the cable network address management server (resource server) at the cable headend. The cable modem stack is a "client" that communicates with the cable network address management server using the Dynamic Host Configuration Protocol to request the initialization information.

One of the modifications performed by the PPRA is using the IP address obtained during PPP as the "DHCP relay agent" address. DHCP refers to a Dynamic Host Configuration Protocol. This information is embedded by the PPRA in the DHCP requests that the PPRA receives from the cable modem stack before forwarding the requests to the cable network address server via the phone modem adapter. The cable network address server/DHCP server then responds to the address of the relay agent (also known as a DHCP proxy agent). The PPRA identifies the packets as DHCP packets when they are received at the phone modem adapter and then forwards them to the cable modem stack. The cable modem stack is thereby initialized and able to receive Internet data via the one-way RF broadcast channel.

The DHCP address is assigned each time (e.g., session) the user wishes to connect to the Internet. Once connected, the user can surf any number of sites using the address assigned for the connection. When the user disconnects and the DHCP server is informed of the disconnect event, the server is free to reuse this address and assign it to any other client.

Moreover, the address assigned to the cable modem TCP/IP stack using DHCP may be different for each initialization/network session.

Generally, there is no point-to-point communication between the ISP phone network address server and the cable network address server. The request for session initialization for the cable modem adapter is a UDP/IP packet with the destination address of the cable network server, and is routed/forwarded through the phone network to the destination based on this address. The DHCP server/cable network address server responds to the DHCP relay agent address, which is the IP address associated with the phone modem.

The PPRA looks at incoming DHCP messages from the network at the phone modem, identifies that the message is for the cable modem by looking into the contents (e.g., UDP/DHCP data portion) of the message, and forwards the message to the cable modem stack. The response from the cable network server at session initialization comes back along the phone path, and not the cable (e.g., RF broadcast) path.

The cable network addresses are assigned from a different network than the ISP's network. The Internet server that the user is accessing responds to the cable network address assigned to the cable modem. All packets with destination addresses belonging to the cable network are routed from the Internet to an MSO router by normal IP routing and forwarding rules. Once at the MSO router, packets with destination addresses belonging to the cable modems are forwarded to a broadband network hub for communication to the cable modems.

Moreover, at session termination, when a user clicks on a disconnect session button on the PC screen or the like, the cable modem is first uninitialized. The DHCP client in the cable modem stack sends out a message to the cable network address server indicating that it is releasing the IP address. The DHCP server is now free to assign this address to any other cable modem. After the DHCP release message is sent out, the phone connection is closed by using the PPP to uninitialize the IP address associated with the phone modem stack, and then disconnecting the phone link.

A particular method is presented for initializing a one-way adapter that receives data from a computer network via a first communication path, and communicates with a two-way adapter via a packet processing relay agent, wherein the two-way adapter is adapted to receive data from, and send data to, a service provider (e.g., ISP) of the computer network via a second communication path.

The method includes the steps of: establishing a link between the two-way adapter and the service provider via the second communication path, e.g., in response to a user request to access the Internet, obtaining an address from the service provider, and communicating the address to the packet processing relay agent via the second communication path and the two-way adapter. A session initialization request packet is provided from the one-way adapter to the packet processing relay agent.

The packet processing relay agent provides the session initialization request packet with: (a) a source address according to the address obtained from the service provider, and (b) a destination address of a network address server (resource server) associated with the first communication path. The session initialization request packet is then communicated to the network address server via the two-way adapter and the second communication path according to the destination address thereof.

The network address server responds to the packet communicated thereto by communicating address configuration information to two-way adapter via the second communication path according to the relay agent address. The packet processing relay agent obtains the address configuration information from the two-way adapter for use in initializing the one-way adapter.

The link is established between the two-way adapter and the service provider via the second communication path in response to a user request to access the computer network.

The session initialization request packet is provided from the one-way adapter to the packet processing relay agent in response to a user request to access the computer network.

The first communication path may include a cable television link, a satellite television link, MMDS, LMDS, and/or UHF link.

Similarly, the one-way adapter may include a cable television modem, satellite television modem, MMDS, LMDS and/or UHF modem or other wired or wireless modem. MMDS employs line-of-sight terrestrial signals such as microwave signals.

The second communication path may include a telephone link, and the two-way adapter may include a modem.

The packet processing relay agent may be adapted to process data packets forwarded thereto to provide functional enhancements including at least one of: application level proxy, DHCP relay agent, IGMP proxy, IP encapsulation, IP filtering, data-link layer tunneling, data-link layer filtering, and proxy ARP agent.

The address configuration information may be provided by the network address server according to a DHCP.

The method may include the further step of providing a confirmation message from the one-way adapter to the network address server via the packet processing relay agent, two-way adapter, and second communication path to confirm receipt of the address configuration information at the one-way adapter.

The method may include the still further step of providing a confirmation message from the network address server to the one-way adapter via the second communication path, the two-way adapter, and the packet processing relay agent to confirm receipt of the confirmation message from the one-way adapter.

A corresponding apparatus is also presented.

DETAILED DESCRIPTION OF THE INVENTION

The present invention provides dynamic network configuration of a one-way adapter in a one-way communication system such as a cable television system or the like. A proxy agent is provided for communicating with a resource server of the computer network through a configured return path adapter, thereby providing bi-directional communication between the one-way adapter and the resource server.

The term "computer network" is used herein to refer to any network, internet, the Internet, subnet or the like.

A protocol for communicating data in a computer network is often defined by a stack of protocol layers. Each layer performs a service for the next higher layer, and each layer's protocol is independent of the other layer's protocols. The services performed may include adding header and/or trailer information, setting a timer, or performing error detection and/or error correction, for example.

The lowest layer in the stack is the physical layer, which is a physical medium. Next, a data link layer, network layer, transport layer, and application layer may be provided. The application layer refers to software such as a browser operating on a PC. The transport layer enhances the reliability of the network layer by accounting for lost or errored packets, and allows a standard set of primitives to be used with different networks. The network layer chooses appropriate paths (e.g., links and routers) for communicating packets of data from a source to a destination, and allows communication between different types of networks. In particular, management of bandwidth in the different links and routers is provided. The data link layer accounts for framing of data packets (e.g., proper size of the data frame), error control, flow control, and error detection and correction. The physical layer, which may include copper wire or optical fiber, or a wireless path, is the medium over which data packets are communicated.

At the network layer, the data from the transport layer is provided as a packet, and a packet header may be added. At the data link layer, the data from the network layer is provided as a frame, and a frame header may be added. Processing of packets may be referred to at the data link layer, where it is understood that frames of packets are provided. Finally, at the physical layer, the frame is modulated onto a carrier for transmission across the physical medium.

Frames of data that are received by the destination machine are processed in a reverse order, e.g., from the physical layer to the data link layer, network layer, transport layer, and application layer.

In particular, the Internet typically uses a connection-oriented transport layer protocol known as TCP, and a network layer protocol known as IP. TCP service is established by having the sending and receiving machines create end points known as sockets. Each socket has a socket number or address that includes the IP address of the host and a 16-bit number local to the host, known as a port. Thus, TCP header includes a source port and a destination port. A connection is explicitly established between a socket on the sending machine and a socket on the receiving machine using socket calls.

However, TCP/IP stack difficulties are encountered when communicating data from a computer network to a PC or router/bridge device via a one-way broadcast network, where the return path is provided, e.g., by an upstream telephone link from the PC or router/bridge device to the computer network.

For example, for a cable modem system, the cable television plant may allocate a standard television channel (e.g., 6 MHz) to data transfer for Internet and multimedia services. A PC interfaces with the television plant (e.g., "broadcast plant") network via the cable modem using the same type of hook-up as a television. Once connected, the cable modem tunes to the channel set aside for data transfer to access the Internet and other multimedia services offered by the cable television operator.

The cable modem receives digital information carried over the television network and passes it through to the PC. Return signal communication from the PC at the customer premises to the Internet server is provided over an alternate path, such as a telephone connection.

Furthermore, in a "dual-homed" cable modem architecture, IP addresses for a cable modem and a telephone modem (e.g., return path adapter) are usually dynamically assigned and managed from different address pools. The cable modem and telephone modem are also known as "adapters". The term "dual-homed" refers to an architecture where there are two networks adapters in a single device, such as a PC, and different IP addresses are used for each of these adapters. The address of the phone adapter may be assigned using IPCP, while the address of the cable modem is typically assigned using a DHCP, for example.

In the dual-homing cable modem network architecture, due to the one-way nature of the cable television link, all upstream traffic is directed to the phone modem. Data sent from the Internet server to the PC should be addressed to the IP stack associated with the cable modem adapter. However, the packets going out of the phone adapter usually have the IP address associated with the phone adapter. This arrangement violates the routing/addressing conventions of most client TCP/IP stacks.

Figure 1:
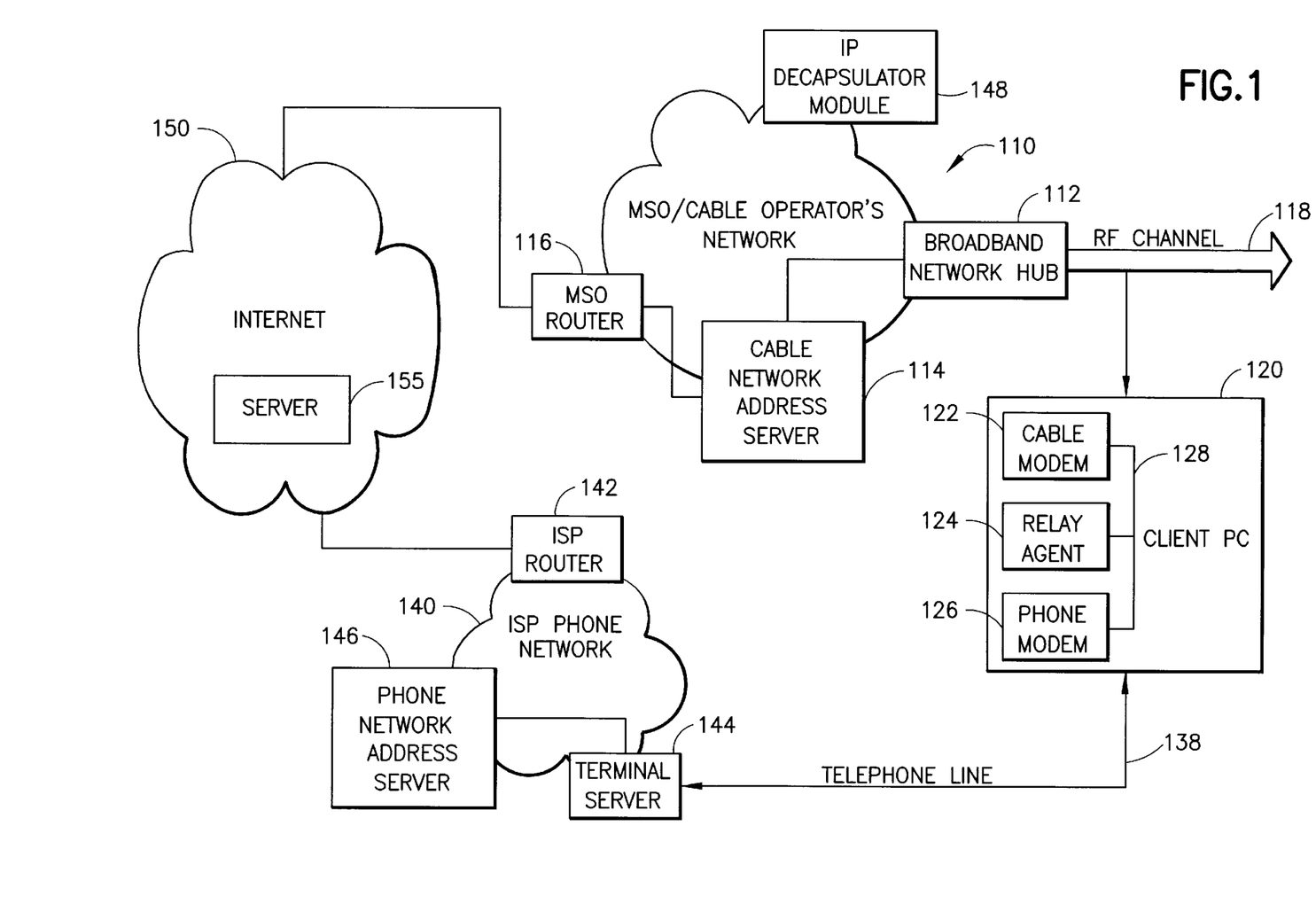
FIG. 1 illustrates a system architecture in accordance with the present invention.

FIG. 1 illustrates a system architecture in accordance with the present invention. The architecture includes a MSO/cable operator's network 110, a client PC 120, which may be located at a user's home, an ISP phone network 140 (e.g., switching facility), and a computer network 150 such as the Internet. The MSO/cable operator's network 110 includes a MSO router 116 for communicating with the Internet 150, a cable network address server 114 for assigning DHCP address to different cable modems served by the network 110, and a broadband network hub 112 that provides data on an RF channel 118 to a population of cable modems. An IP decapsulator module 148 may also be associated with the cable operator's network 110.

Optionally, the IP decapsulator module 148 may be provided between the ISP phone network 140 and the Internet 150.

The RF channel may be a cable link, e.g., comprising optical fiber and/or coaxial cable, or a wireless network, such as a satellite link, or a MMDS link. Note that the RF channel 118 can also broadcasts television signals and other data to a decoder population in a conventional manner. The present invention is compatible with existing broadcasting and receiving equipment.

The PC 120, which could alternatively be a router/bridge device connected to one or more PCs in a home, e.g., in a LAN, includes a one-way cable modem 122 (e.g., one-way adapter), a packet processing relay agent 124 in accordance with the present invention, and a phone modem 126 (e.g., twoway adapter). The phone modem 126 includes transmit and receive capabilities, while the cable modem 122 is receive-only. A communication path 128 allows communication between these elements. The cable modem 122 and phone modem 126 may be provided as internal or external cards of the PC, for example. The relay agent 124 may be implemented in software, firmware, and/or hardware in the PC 120 or in a device external to the PC 120. The modem 122 may be used with cable, satellite, MMDS, LMDS, UHF or other signals, for example.

Note that the PC 120 includes conventional hardware components such as a CPU and memory, that may provide control signals to the cable modem 122 and phone modem 126 as well as implement the functions of the relay agent 124.

The ISP phone network 140 receives data from the phone modem 126 via a telephone line 138. The ISP phone network 140 includes a terminal server 144, phone network address server 146, and an ISP router 142 that connects the ISP phone network 140 to the Internet 150. The Internet 150 includes a representative server 155 that stores data for retrieval by the PC 120.

The PPRA 124 is a data link layer forwarding entity that may be used in one-way systems where data is received through one interface but is sent out through a different return path interface. Additional transport, network or link layer processing may be included in the packet processing agent, transparent to the higher layers in the protocol stack.

The PPRA 124 looks at all packets received from the protocol stack bound to a one-way adapter. In the illustrated embodiment, the one-way adapter is the cable modem 122, which only receives downstream information from the cable television network 114 via the RF channel 118. In addition, the relay agent 124 monitors all packets sent to, and received from, the return path adapter, which in the illustrated embodiment is the phone modem 126. At a minimum, the PPRA 124 forwards packets at the data link layer from the one-way adapter 122 to the return path adapter 126.

In some cases, routers on the telephone return network, such as ISP router 142, may reject packets if the source address of the packets is not from networks they manage. For example, if a packet has a source address corresponding to the cable modem 122, it will not be recognized by the ISP router 142, and is therefore dropped (discarded) at the ISP router 142. However, a packet with a source address from the phone modem 126 will be recognized, and is permitted to traverse from the ISP network 140 to the Internet 150. The ISP router 142 uses an anti-spoofing filter to filter out packets that are not recognized. Additionally, the source addresses on recognized packets are those addresses previously assigned by the phone network address server 146 Data-link layer or network layer tunneling protocols can be used to circumvent such an anti-spoofing filter. Tunneling allows communication between source and destination hosts that are on different networks which are of the same type, but are separated by a network with a different type. With tunneling, an entire packet is carried in the payload data field of another packet.

The tunnels defined over the data link layer (Layer 2, Point-to-Point Tunneling Protocol "PPTP", Layer 2 Tunneling Protocol "L2TP") and the network layer (Layer 3, IP tunneling) are two-way tunnels. As the cable modem network architecture is asymmetrical with respect to routing, an IP tunneling scheme, such as that defined in IETF RFC 2003, may be partially implemented on the cable modem system.

The invention implements a one-way tunnel in the upstream direction, through the ISP phone network 140, e.g., from the PC 120 to the IP decapsulator 148 in the MSO/cable operator's network 110. At the network layer, the source address in the outer IP header of each packet is the IP address that is addressed to the PPP adapter, or the IP address of the phone modem 125. The destination address in the header is that of the IP decapsulator module 148. When an anti-spoofing filter is used at the ISP router 142, all outgoing packets from the cable modem stack are encapsulated as discussed before being sent out of the phone adapter 126 by an IP encapsulation function implemented in the PPRA 124.

As mentioned, the address of the phone modem 126 is assigned using the IPCP, while preferably the address of the cable modem 122 is assigned using a DHCP. Network provisioning using DHCP requires bidirectional communication with the DHCP cable network address server 114 through the adapter that needs the configuration parameters, e.g., the cable adapter 122.

Figure 2:
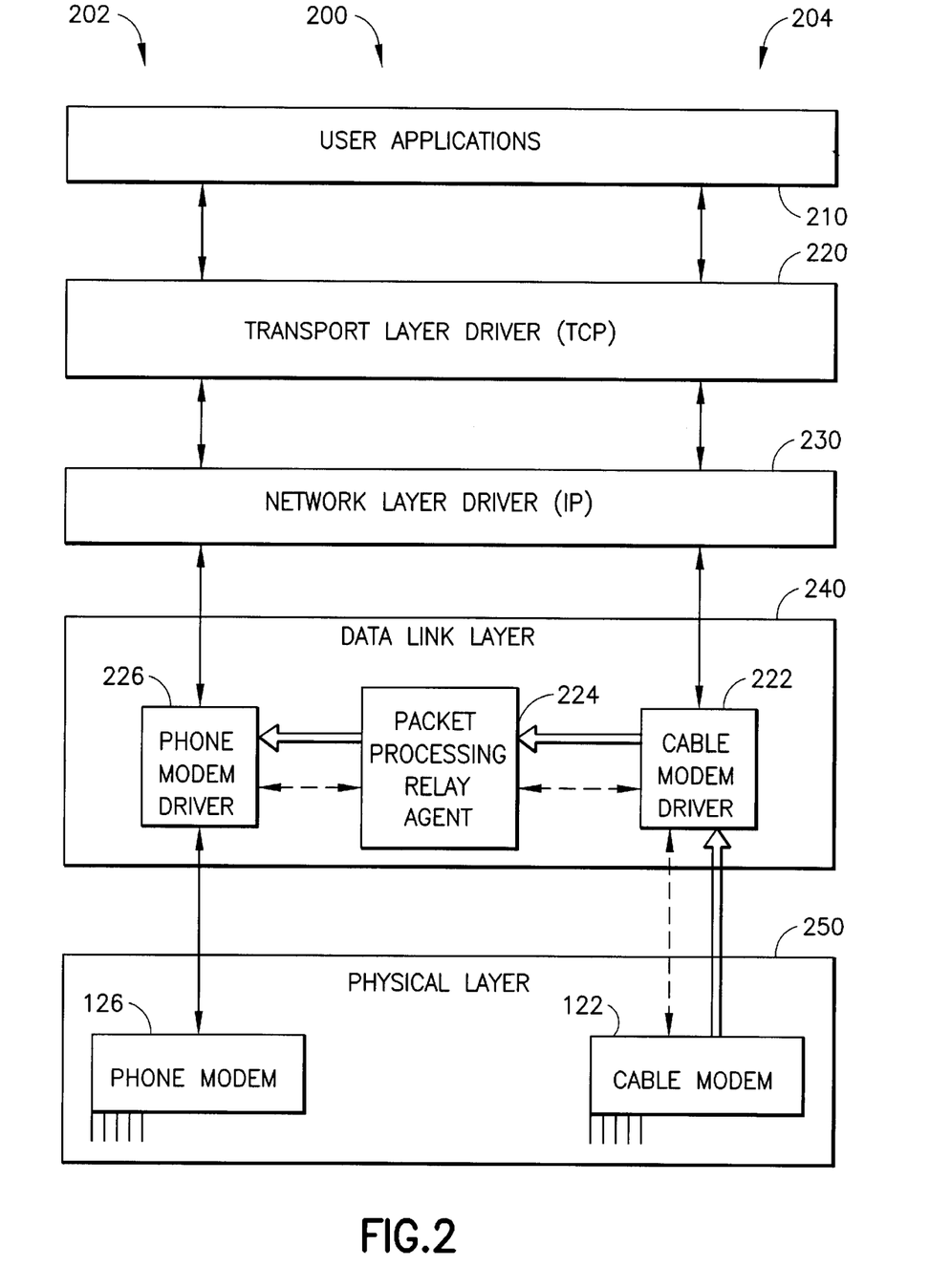
FIG. 2 illustrates a protocol stack in accordance with the present invention.

FIG. 2 illustrates a protocol stack in accordance with the present invention. The stack 200, representing the protocol of the PC 120, includes user applications 210 (e.g., such as an Internet browser running on a PC), a transport driver layer 220, e.g., using TCP, a network drive layer 230, e.g., using IP, a data link layer 240, and a physical layer 250.

The data link layer 240 includes a phone modem driver 226, a PPRA 224, and a cable modem driver 222. The physical layer includes the phone modem 126 and cable modem 122. The PC receives data via the receive-only cable modem 122, and sends and receives data via the phone modem 126. For example, a user may enter a request at the user application layer 210 to view a web page at a web site on the Internet. In this case, processing flows from the user application layer 210, to the transport layer driver 220, to the network layer driver 230, to the cable modem driver, to the relay agent 224, to the phone modem driver 226, and finally to the phone modem 126. Note that the cable modem driver 222 sends the user request to the relay agent 224 instead of the cable modem 122. The phone modem 126 then uses the telephone link to forward a message to the phone network. The message is then routed to the appropriate Internet server based on its destination address.

The server 155 receives the request for the appropriate web page, typically according to the HTTP. The server 155 sends the requested information back to the PC 120 at the IP address associated with the cable modem adapter 122. Specifically, the requested information is sent to the MSO/cable operator's network, and is then sent over the RF channel 118 and received by the cable modem 222. Processing for this data flows from the cable modem 122, to the cable modem driver 222, to the network layer driver 230, to the transport layer driver 220, and finally to the user application layer 210, where it is processed by the browser and displayed on the PC's screen.

Initially, when the PC 120 wishes to establish a connection with the ISP phone network 140 of FIG. 1, a session initialization must occur.

Firstly, the phone modem 126 needs to connect with the terminal server 144 and obtain an IP address that is then assigned to the TCP/IP stack associated with the phone modem. Information exchanged between the PC and the ISP phone network 140 during session initialization includes connection request and connection indication primitives.

At this point, two-way communication with servers on the Internet is possible over the phone link. Next, the cable modem stack needs to be initialized. This means that the cable modem needs to obtain its IP address and network configuration information. Since the cable modem 122 is a oneway, receive-only adapter, this request for information is sent out through the phone modem adapter 126 using the PPRA 124.

In response to the request, the IP address for the cable modem and network initialization information from the cable network address server 114 is received at the phone modem adapter 126 via the Internet 150 and the ISP phone network 140. Once the cable modem stack is initialized, all data communicated to the cable modem stack is received at the cable modem 122 and does not come through the phone modem 126.

Once a connection has been established for the PC, for upstream communication from the cable modem stack to the Internet, packets are forwarded at the data link layer 240 from the cable modem driver 222 to the phone modem driver 226 via the PPRA 124. The packets are then provided from the phone modem driver 226 to the return path adapter (e.g., phone modem) 126, and transmitted upstream to the ISP phone network 140. Additional processing of packets to augment application, transport, network and data-link layer functions can be included in the PPRA 224. Functional enhancements that can be implemented in the PPRA include application level proxy, DHCP relay agent, IGMP proxy, IP encapsulation, IP filtering, data-link layer tunneling and filtering and proxy ARP agents.

Note that the stack 200 may be considered to conceptually represent a phone modem stack 202 on the left-hand side, and a cable modem stack 204 on the right-hand side. In the data link layer 240, the PPRA 224 may be considered an interface between the phone modem stack 202 and the cable modem stack 204 at the data link layer.

Generally, in FIG. 2, the dashed lines represent possible data flow during initialization, while the thick lines represent possible data flow in a normal Internet access run mode of the cable modem, following initialization. The path between the phone modem driver 226 and the phone modem 126 is bi-directional at all times, and can therefore carry both initialization data and Internet data as required.

Figure 3:
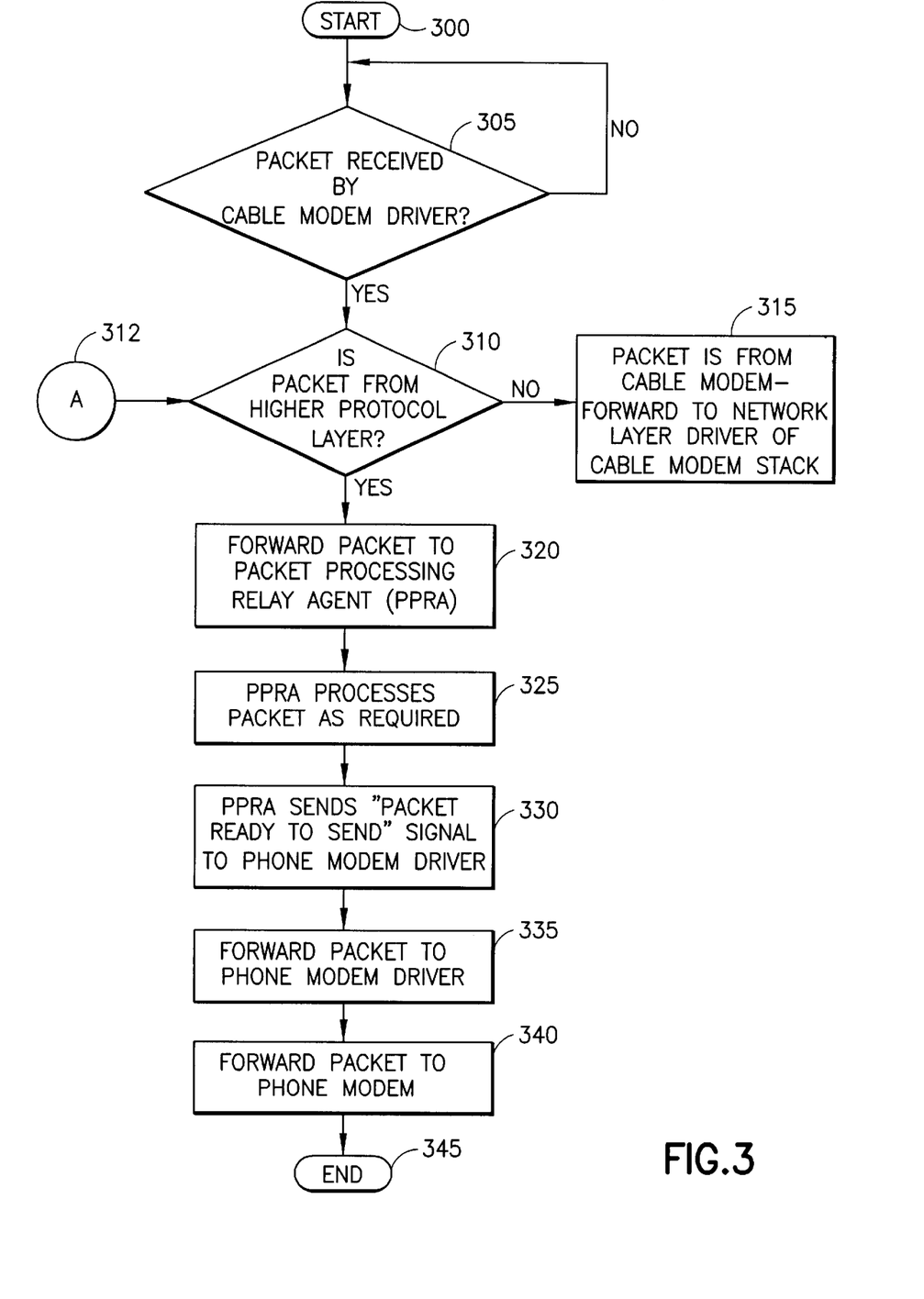
FIG. 3 illustrates a process flow for a cable modem driver in accordance with the present invention.

FIG. 3 illustrates a process flow for a cable modem driver in accordance with the present invention. Processing begins at box 300. At box 305, a determination is made as to whether a packet is received by the cable modem driver. If so, processing proceeds at box 310, where a determination is made as to whether the packet is from a higher protocol layer. Processing may also proceed at box 310 via "A" 312 from FIG. 4 for packets received by the cable modem driver 222 from the PPRA 224.

Note that data received by the cable modem driver from the PPRA (e.g., from "A" 312) may include session initialization data for establishing a session with the Internet. Moreover, DHCP transactions at session initialization of the cable modem require two-way communication with the cable network address server 114. The initialization data is sent from the cable network address server 114 to the phone modem interface, and is intended to be sent to the cable modem stack.

If the packet is not from a higher protocol layer, the packet is from the cable modem 122 at the lower, physical layer in the cable modem stack 204. In this case, at box 315, the packet is forwarded upward to the network layer driver and subsequent higher layers in the cable modem stack 204. The data received by the cable modem driver 222 from the cable modem 122 is the data, such as a web page, sent over the downstream channel of a cable television plant (e.g., RF channel 118), satellite broadcast link, or other channel.

If the packet is from a higher protocol layer (e.g., layers 210, 220, or 220), at box 320, the packet is forwarded to the PPRA. At box 325, the PPRA processes the packet as required. This processing may include encapsulation or decapsulation, or any of the functional enhancements referred to previously. Once processing is complete at the PPRA 224, at box 330, the PPRA sends a "packet ready to send" signal to the phone modem driver 226. At box 335, the packet is forwarded to the phone modem driver, and at box 340, the packet is forwarded from the phone modem driver 226 to the phone modem 126. The packet is then ready for transmission upstream on a telephone link. Processing terminates at box 345.

Figure 4:
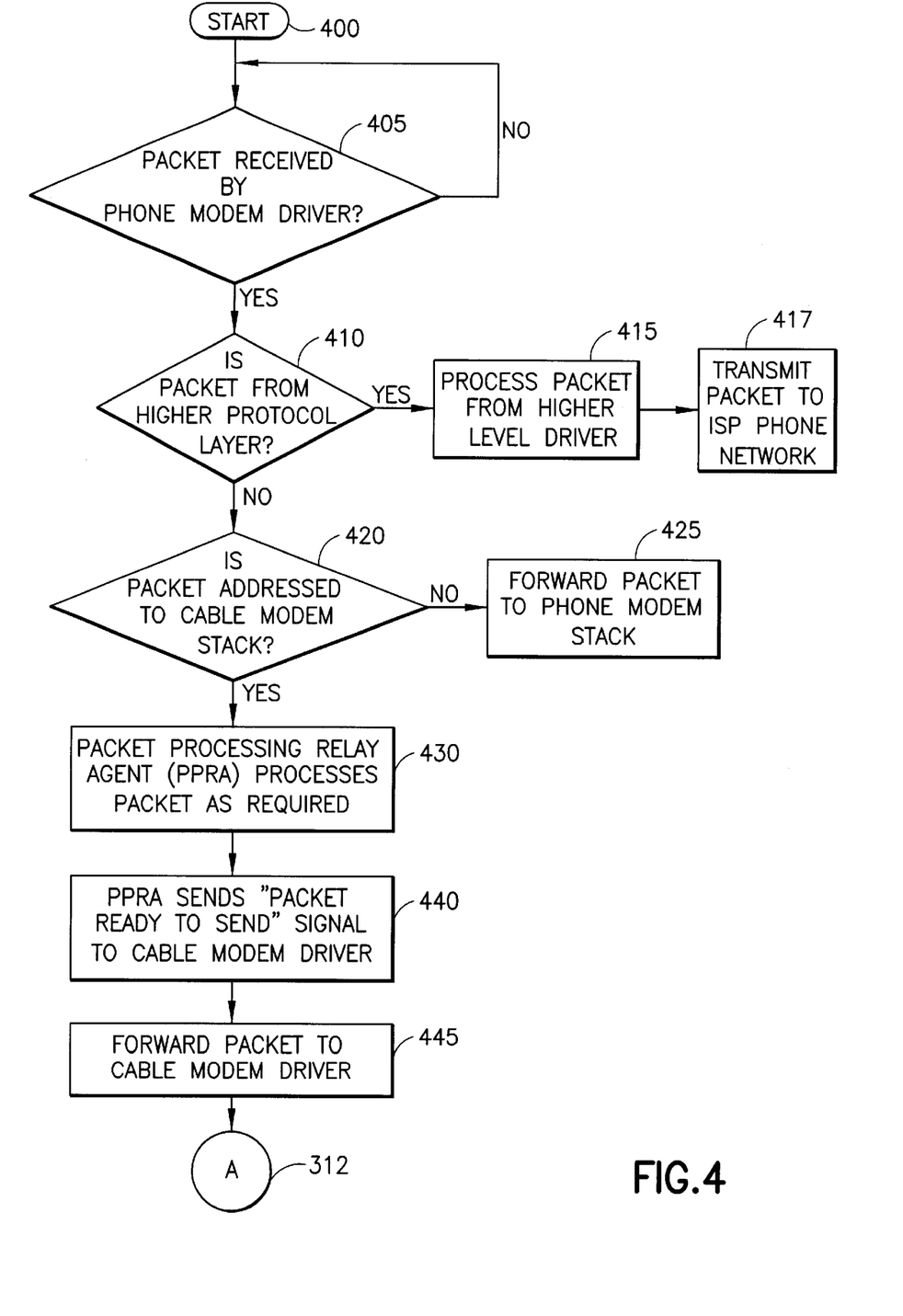
FIG. 4 illustrates a process flow for a phone modem driver in accordance with the present invention.

FIG. 4 illustrates a process flow for a phone modem driver in accordance with the present invention. The process flow begins at box 400. At box 405, a determination is made as to whether a packet is received by the phone modem driver 226. Recall that frames comprising several packets are processed by the phone modem driver at the data link layer. If a packet is present, a determination is made at box 410 as to whether the packet is from a higher protocol layer. If so, at box 415, the packet is from a higher level driver in the phone modem protocol stack (such as the network layer driver 230). The packet is then processed as required. The packet may subsequently be transmitted to the ISP phone network 140 via a telephone link at box 417.

If the packet is not from a higher level in the phone modem protocol stack, at box 420 a determination is made as to whether the packet is addressed to the cable modem stack. If not, at box 425, the packet is forwarded upward in the phone modem stack. For example, the packet intended for the phone modem stack may include session initialization data for the phone modem.

If the packet is addressed to the cable modem stack, at box 430, the packet is processed by the PPRA as required. This processing can include encapsulation or decapsulation, or any of the other functional enhancements referred to above. For example, the packet intended for the cable modem stack may include session initialization data for the cable modem. Communication of data to the cable modem stack via the phone modem driver will typically occur during the initialization phase of the cable modem stack. Once the system is initialized and the network is operational, communications from the Internet to the cable modem occur via the broadcast RF channel and not via the phone modem.

When processing is completed at the PPRA, at box 440, the PPRA sends a "packet ready to send" signal to the cable modem driver. At box 445, the packet is forwarded to the cable modem driver, and processing continues at "A" 312 in FIG. 3.

Figure 5:
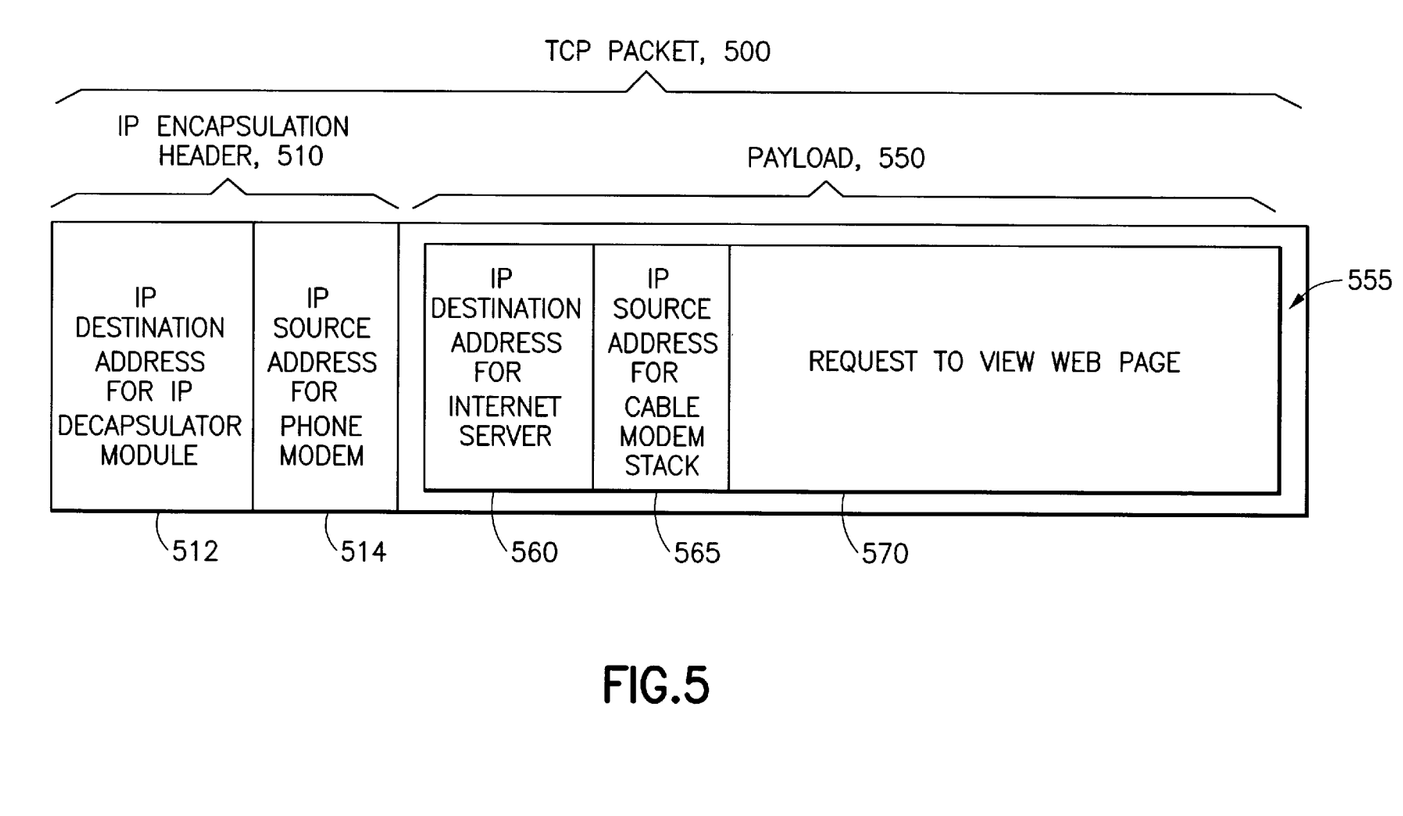
FIG. 5 illustrates a packet that is transmitted from a phone modem to an IP decapsulator at an ISP phone network in accordance with the present invention.

FIG. 5 illustrates a packet that is transmitted from a phone modem to an IP decapsulator at an ISP phone network in accordance with the present invention. A TCP or UDP packet 500 (e.g., encapsulation packet) includes an IP encapsulation header 510 and a payload 550. Note that the packet 500 is shown in a simplified form, as various other fields such as a checksum field and a sequence number field are not shown.

The IP encapsulation header 510 includes an IP destination address for an IP decapsulator module 512, and an IP source address for the phone modem 514. The payload 550 carries another entire TCP packet 555, which includes an IP destination address for an Internet server 560 (or other location in a computer network), an IP source address for a cable modem stack 565, and a payload 570, such as data requesting to view a web page for the particular Internet server in the destination address 560. Here, the TCP packet 555 is tunneled within the TCP packet 500. This configuration circumvents the anti-spoofing filters used by telephone networks.

Specifically, a telephone network employing anti-spoofing filters would not recognize the IP source address for the cable modem stack 565 since the cable modem is not part of the telephone network. However, the telephone network will recognize the IP source address for the phone modem 514, since the phone modem is part of the telephone network. When the TCP packet 500 is received by an IP decapsulator module 148 (FIG. 1), the packet 555 is extracted and routed to the server 155 identified by the IP address 560.

Note that if anti-spoofing filters are not used by the ISP phone network 140, the packet 555 may be transmitted directly without tunneling.

When the Internet server 155 of FIG. 1 receives a request to view a particular web page, the server transmits the web page as HTML data according to the IP source address for the cable modem stack 565 of FIG. 5. This IP source address 565 designates that the MSO router 116 should receive the requested web page or other data.

Figure 6:
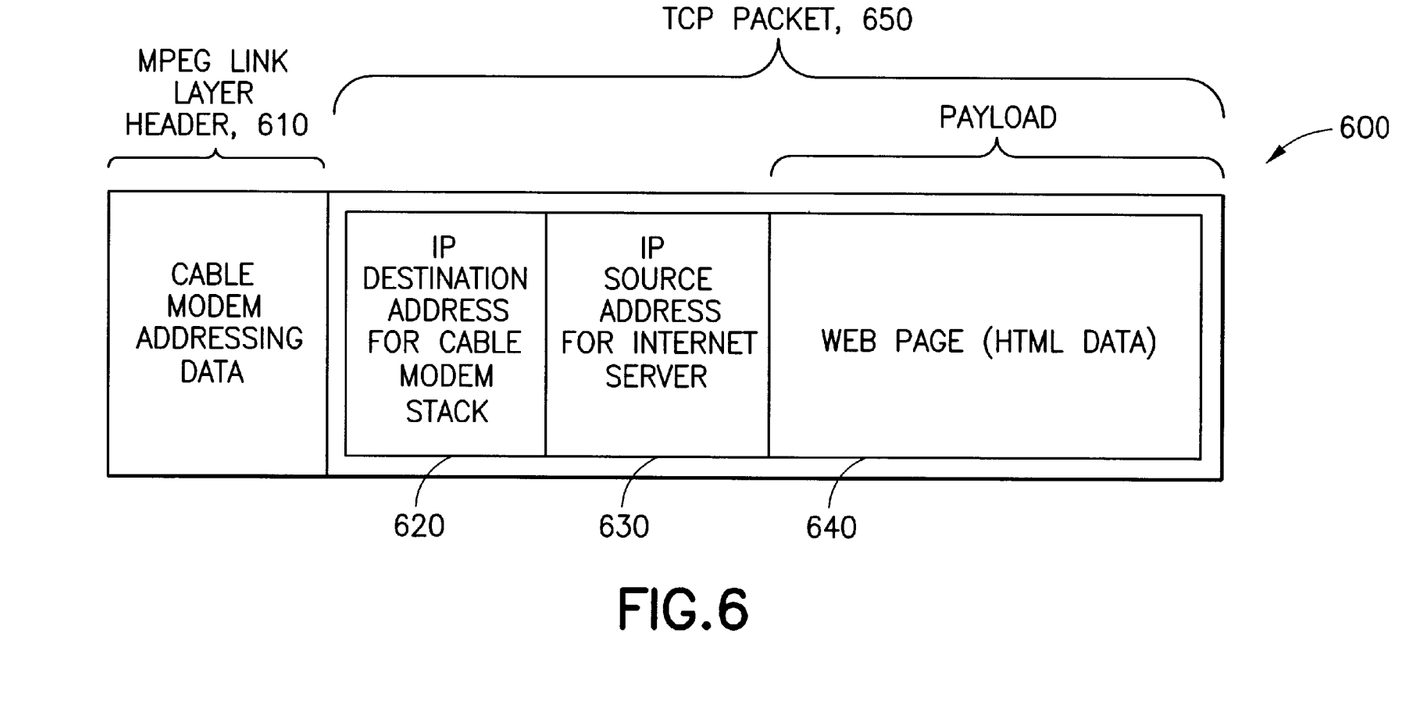
FIG. 6 illustrates a packet that is transmitted from a cable operator's network to a cable modem in accordance with the present invention.

FIG. 6 illustrates a packet that is transmitted from a cable operator's network to a cable modem in accordance with the present invention. The web page or other Internet data is transmitted from the server 155 to the MSO router 116 as a TCP/IP packet 650, which includes the IP destination address for the cable modem stack 620, the IP source address of the Internet server 630, and a payload portion 640 comprising the requested web page data or other data.

When the TCP packet 650 is received by the MSO router 116, it is forwarded to the broadcast network hub 112 since the IP destination address on the packet is that assigned to the cable modem on the downstream RF channel. The broadband network hub 112 transmits an overall data packet 600 that includes the TCP/IP packet 650 to the cable modem 122 via the RF channel 118 in an available channel allocation.

Figure 7:
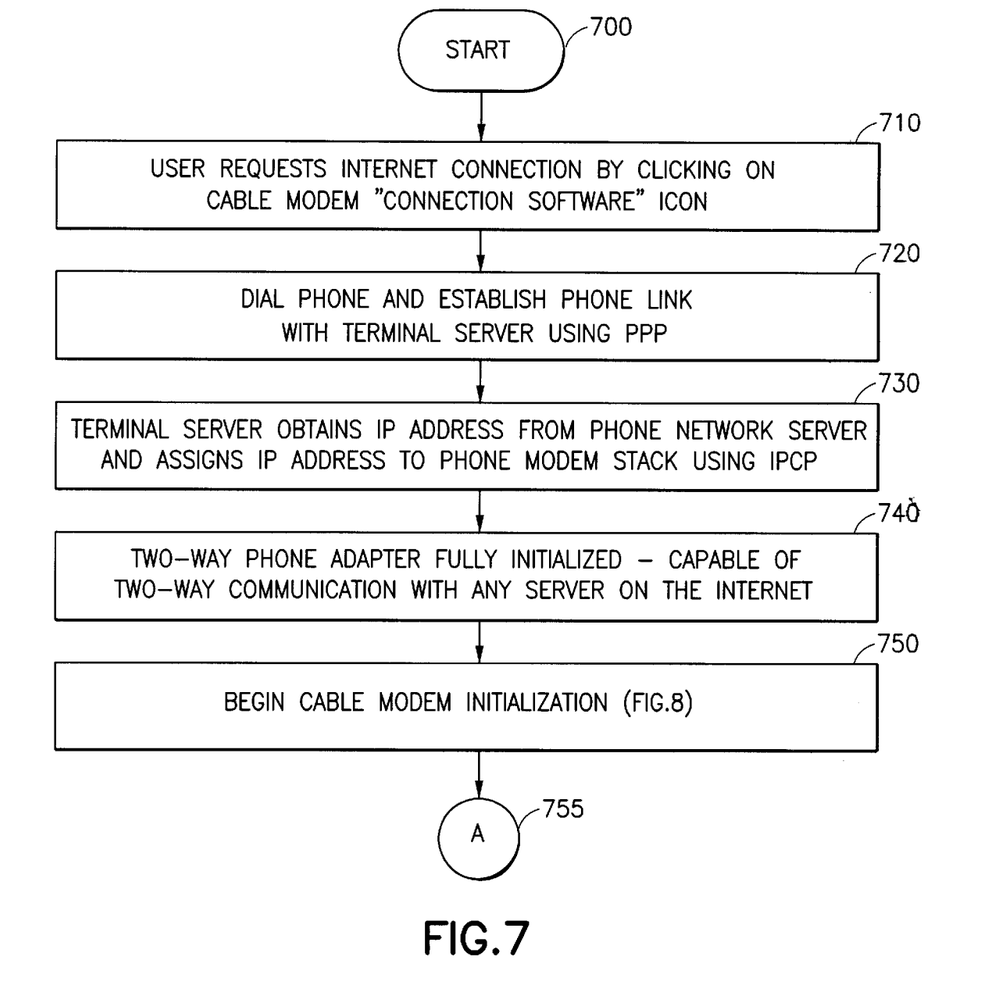
FIG. 7 illustrates a process flow for initializing a two-way adapter such as a phone modem in accordance with the present invention.

FIG. 7 illustrates a process flow for initializing a two-way adapter such as a phone modem in accordance with the present invention. The initialization begins at block 700. At block 710, a user requests an Internet connection by clicking on a cable modem "connection software" icon, e.g., on the screen of the PC. The connection process includes two phases (e.g., initialization of the phone modem adapter, and of the cable modem adapter) and is controlled by a connection manager application of the PC.

At block 720, the phone is dialed and a phone link is established with the ISP's terminal server (e.g., terminal server 144 in FIG. 1) using a PPP. At block 730, the terminal server obtains an IP address from the phone network address server (e.g., server 146 in FIG. 1) and assigns the IP address to the phone modem adapter's TCP/IP stack using IPCP. At block 740, the two-way phone adapter is fully initialized and is capable of providing two-way communication with any server on the Internet or other computer network.

At block 750, initialization of the cable modem begins via "A" 755 as described in connection with FIGS. 8(*a*) and 8(*b*), below.

Figure 8A:
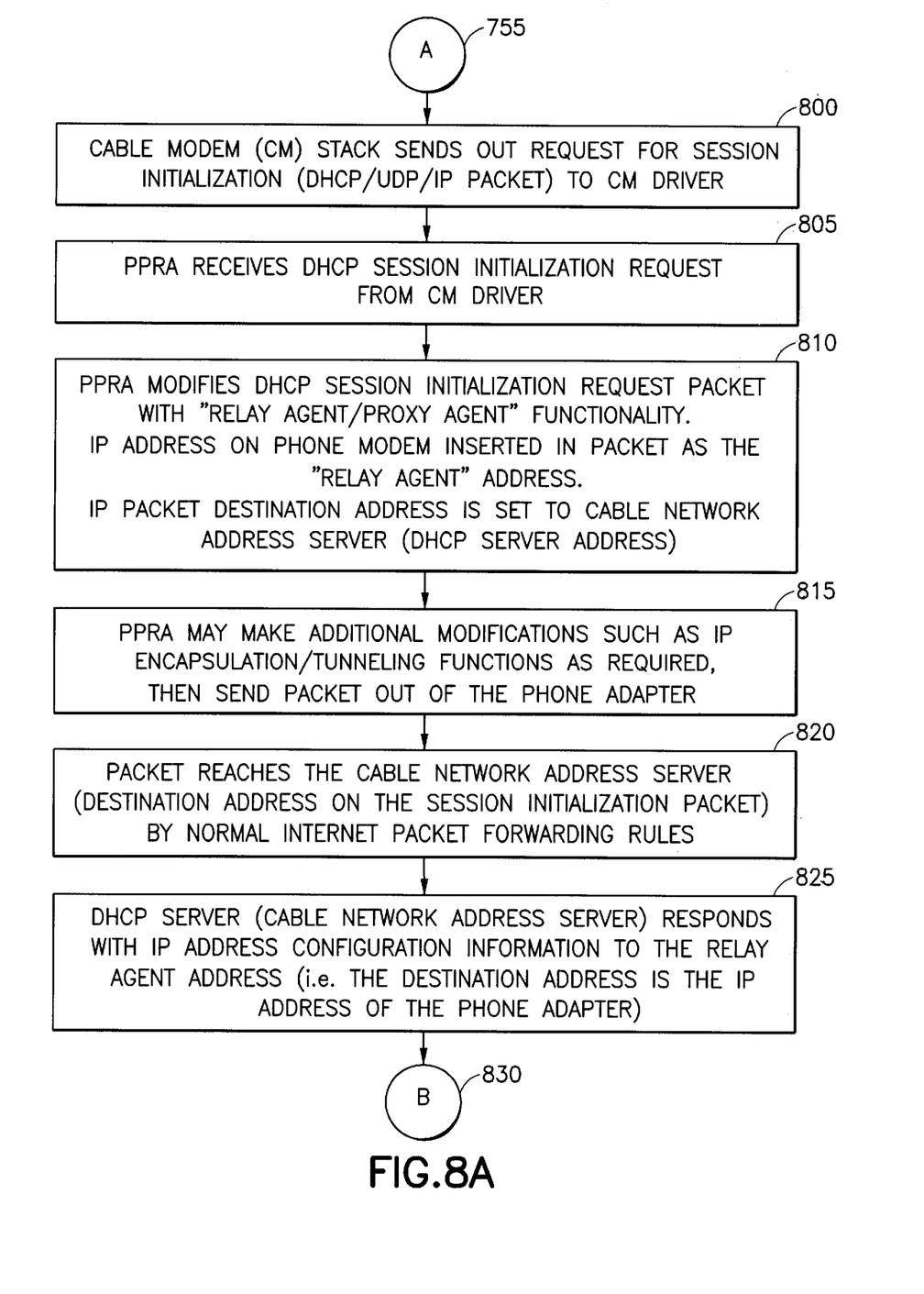
FIG. 8(a) illustrates the first part of a process flow for initializing a one-way adapter such as a cable modem in accordance with the present invention.

FIG. 8(*a*) illustrates the first part of a process flow for initializing a one-way adapter such as a cable modem in accordance with the present invention. At block 800, the cable modem (CM) stack (e.g., stack 204 in FIG. 2) sends out a request for session initialization to the cable modem driver (e.g., driver 222 in FIG. 2). The request may be in the form of a DCHP/UDP/IP packet. At block 805, the PPRA (e.g., PPRA 224 in FIG. 2) receives the DHCP session initialization request from the CM driver.

At block 810, the PPRA may modify the DHCP session initialization request packet with "relay agent/proxy agent" functionality. Additionally, the IP address of the phone modem (see block 730 of FIG. 7) is inserted in the packet as the "relay agent" address. Furthermore, the IP packet destination address is set to that of the cable network address server (e.g., server 114 in FIG. 1), also known as the DHCP server address.

At block 815, the PPRA may make additional modifications to the packet, such as IP encapsulation/tunneling functions, as required, and then send the packet out of the phone adapter and upstream on the telephone line.

At block 820, the packet reaches the cable network address server according to the destination address on the session initialization packet using normal Internet packet forwarding rules.

At block 825, the DHCP server, e.g., the cable network address server, responds to the packet with IP address configuration information for the relay agent address. That is, the destination address of the response is the IP address of the phone adapter.

Figure 8B:
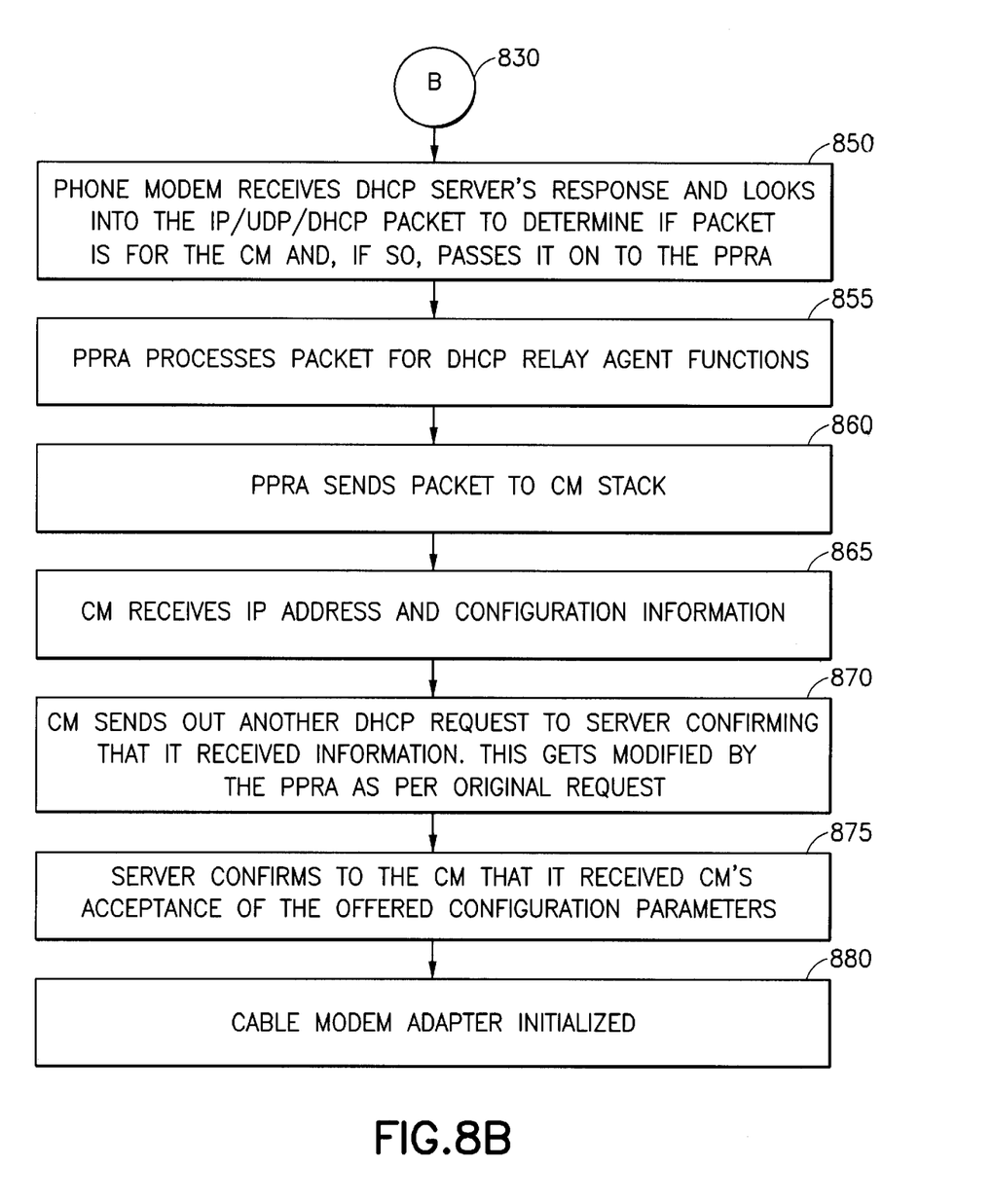
FIG. 8(b) illustrates the second part of a process flow for initializing a one-way adapter such as a cable modem in accordance with the present invention.

The process continues via "B" 830 in FIG. 8(*b*).

FIG. 8(*b*) illustrates the second part of a process flow for initializing a one-way adapter such as a cable modem in accordance with the present invention. At block 850, the phone modem receives the response from the DHCP server and looks into the IP/UDP/DHCP packet to determine if the packet is for the cable modem, and if so, passes the packet on to the PPRA.

If the packet is not intended for the cable modem, it is passed to the phone modem stack.

At block 855, the PPRA process the packet for DHCP relay agent functions. At block 860, the PPRA sends the packet to the cable modem stack. At block 865, the cable modem receives the IP address and configuration information. At block 870, the cable modem sends out another DHCP request to the cable network address server confirming that it received the information. The request is modified by the PPRA as per the original request (see blocks 810 and 815 in FIG. 8(*a*)).

At block 875, the cable network address server sends a confirmation message to the cable modem informing the cable modem that it received the CM's acceptance of the offered configuration parameters. At block 880, the cable modem is initialized and is ready to receive Internet data via the one-way RF channel.

It should now be appreciated that the present invention provides a method of forwarding data between a one-way network adapter and a two-way return path adapter. The invention is not limited to use with cable television systems nor with telephone return paths. Any suitable one-way network adapter and two-way return path adapter can be linked using the PPRA disclosed herein.

Moreover, the term "one-way adapter" is meant to encompass an adapter that has only a one-way receive-only capability, as well as an adapter that has a two-way capability but is operating in a one-way mode.

The present invention provides dynamic network configuration of a one-way adapter in a one-way communication system such as a cable television system or the like. A proxy agent is provided for communicating with a resource server of the computer network through a configured return path adapter, thereby providing bi-directional communication between the one-way adapter and the resource server.

First, a two-way adapter such as a phone modem is initialized by establishing a telephone link with a terminal server of an Internet Service Provider telephone network. The terminal server obtains an IP address from a phone network address server, and assigns the IP address to the phone modem stack.

Next, a one-way adapter such as a cable modem is initialized. The cable modem stack sends out a request for session initialization to a cable modem driver. The request is processed by a PPRA, and the IP address of the phone modem is inserted into the packet. The IP packet destination address is set to that of a cable network address server. The packet is sent out of the phone adapter and upstream to the cable network address server via the telephone line.

The cable network address server responds to the packet with IP address and configuration information for the relay agent address. The phone modem receives the response from the cable modem address server and passes it to the cable modem stack via the PPRA to recover the IP address and configuration information. The cable modem is then initialized and ready to receive Internet data via a one-way RF channel.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for initializing a one-way adapter that receives data from a computer network via a first communication path, and communicates with a two-way adapter via a packet processing relay agent, wherein said two-way adapter is adapted to receive data from, and send data to, a service provider of said computer network via a second communication path, comprising the steps of:

establishing a link between said two-way adapter and said service provider via said second communication path;

obtaining an address from said service provider, and communicating said address to said packet processing relay agent via said second communication path and said two-way adapter;

providing a session initialization request packet from said one-way adapter to said packet processing relay agent;

said packet processing relay agent providing said session initialization request packet with: (a) a source address according to said address obtained from said service provider, and (b) a destination address of a network address server associated with said first communication path; and communicating said session initialization request packet to said network address server via said two-way adapter and said second communication path according to said destination address thereof; wherein:

said network address server responds to said packet communicated thereto by communicating address configuration information to said two-way adapter via said second communication path; and said packet processing relay agent obtains said address configuration information from said two-way adapter for use in providing initialization of said one-way adapter.

2. The method of claim 1, wherein:
said link is established between said two-way adapter and said service provider via said second communication path in response to a user request to access said computer network.

3. The method of claim 1, wherein:
said session initialization request packet is provided from said one-way adapter to said packet processing relay agent in response to a user request to access said computer network.

4. The method of claim 1, wherein:
said first communication path comprises at least one of a cable television link, a satellite television link, and a terrestrial broadcast television link.

5. The method of claim 1, wherein:
said one-way adapter comprises one of a cable television modem, satellite television modem, and a terrestrial broadcast television modem.

6. The method of claim 1, wherein:
said second communication path comprises a telephone link.

7. The method of claim 1, wherein:
said two-way adapter comprises a modem.

8. The method of claim 1, wherein said packet processing relay agent is adapted to process data packets forwarded thereto to provide functional enhancements including at least one of:

application level proxy, Dynamic Host Configuration Protocol relay agent, Internet Group Management Protocol proxy, Internet Protocol encapsulation, Internet Protocol filtering, data-link layer tunneling, data-link layer filtering, and proxy Address Resolution Protocol agent.

9. The method of claim 1, wherein:
said address configuration information is provided by said network address server according to a Dynamic Host Configuration Protocol.

10. The method of claim 1, comprising the further step of:
providing a confirmation message from said one-way adapter to said network address server via said packet processing relay agent, two-way adapter, and second communication path to confirm receipt of said address configuration information at said one-way adapter.

11. The method of claim 10, comprising the further step of:

providing a confirmation message from said network address server to said one-way adapter via said second communication path, said two-way adapter, and said packet processing relay agent to confirm receipt of said confirmation message from said one-way adapter.

12. An apparatus for initializing a one-way adapter that receives data from a computer network via a first communication path, comprising:

a packet processing relay agent;

a two-way adapter that communicates with said one-way adapter via said packet processing relay agent;

said two-way adapter adapted to receive data from, and send data to, a service provider of said computer network via a second communication path;

means for establishing a link between said twoway adapter and said service provider via said second communication path;

means for obtaining an address from said service provider, and communicating said address to said packet processing relay agent via said second communication path and said two-way adapter; and means for providing a session initialization request packet from said one-way adapter to said packet processing relay agent;

said packet processing relay agent providing said session initialization request packet with: (a) a source address according to said address obtained from said service provider, and (b) a destination address of a network address server associated with said first communication path; and means for communicating said session initialization request packet to said network address server via said two-way adapter and said second communication path according to said destination address thereof; wherein:

said network address server responds to said packet communicated thereto by communicating address configuration information to said two-way adapter via said second communication path; and said packet processing relay agent obtains said address configuration information from said two-way adapter for use in providing initialization of said one-way adapter.

13. The apparatus of claim 12, wherein:

said link is established between said two-way adapter and said service provider via said second communication path in response to a user request to access said computer network.

14. The apparatus of claim 12, wherein:

said session initialization request packet is provided from said one-way adapter to said packet processing relay agent in response to a user request to access said computer network.

15. The apparatus of claim 12, wherein:

said first communication path comprises at least one of a cable television link, a satellite television link, and a terrestrial broadcast television link.

16. The apparatus of claim 12, wherein:

said one-way adapter comprises one of a cable television modem, satellite television modem, and a terrestrial broadcast television modem.

17. The apparatus of claim 12, wherein:

said second communication path comprises a telephone link.

18. The apparatus of claim 12, wherein:

said two-way adapter comprises a modem.

19. The apparatus of claim 12, wherein said packet processing relay agent is adapted to process data packets forwarded thereto to provide functional enhancements including at least one of:

application level proxy, Dynamic Host Configuration Protocol relay agent, Internet Group Management Protocol proxy, Internet Protocol encapsulation, Internet Protocol filtering, data-link layer tunneling, data-link layer filtering, and proxy Address Resolution Protocol agent.

20. The apparatus of claim 12, wherein:

said address configuration information is provided by said network address server according to a Dynamic Host Configuration Protocol.

21. The apparatus of claim 12, further comprising:

means for providing a confirmation message from said one-way adapter to said network address server via said packet processing relay agent, two-way adapter, and second communication path to confirm receipt of said address configuration information at said one-way adapter.

22. The apparatus of claim 21, further comprising:

means for providing a confirmation message from said network address server to said one-way adapter via said second communication path, said two-way adapter, and said packet processing relay agent to confirm receipt of said confirmation message from said one-way adapter.

* * * * *